(12) United States Patent  
Bounitch

(10) Patent No.: US 7,827,424 B2  
(45) Date of Patent: Nov. 2, 2010

(54) DYNAMIC CLOCK CONTROL CIRCUIT AND METHOD

(75) Inventor: Mikhail Bounitch, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 214 days.

(21) Appl. No.: 10/902,344

(22) Filed: Jul. 29, 2004

(65) Prior Publication Data

US 2006/0026450 A1    Feb. 2, 2006

(51) Int. Cl.  
*G06F 1/32* (2006.01)

(52) U.S. Cl. .................. 713/322; 713/320; 713/600

(58) Field of Classification Search ......... 713/300–375, 713/600, 601; 345/213; 711/100–106  
See application file for complete search history.

(56) References Cited

U.S. PATENT DOCUMENTS

| | | | | |
|---|---|---|---|---|
| 4,229,797 A | * | 10/1980 | Ledley | 382/108 |
| 4,412,294 A | * | 10/1983 | Watts et al. | 715/539 |
| 4,747,074 A | * | 5/1988 | Yoshida | 345/522 |
| 4,860,251 A | * | 8/1989 | Bizjak et al. | 345/556 |
| 5,398,048 A | * | 3/1995 | O'Mahony | 345/212 |
| 5,544,101 A | | 8/1996 | Houston | |
| 5,615,355 A | | 3/1997 | Wagner | |
| 5,615,376 A | * | 3/1997 | Ranganathan | 713/322 |
| 5,675,808 A | | 10/1997 | Gulick et al. | |
| 5,729,720 A | | 3/1998 | Kau et al. | |
| 5,752,045 A | | 5/1998 | Chen | |
| 5,781,496 A | | 7/1998 | Pinkham et al. | |
| 5,781,768 A | | 7/1998 | Jones, Jr. | |
| 5,804,749 A | | 9/1998 | Shirakawa et al. | |
| 5,835,435 A | | 11/1998 | Bogin et al. | |
| 5,907,330 A | | 5/1999 | Simmers | |
| 6,002,412 A | * | 12/1999 | Schinnerer | 345/558 |
| 6,014,125 A | * | 1/2000 | Herbert | 345/660 |
| 6,023,262 A | * | 2/2000 | Eglit | 345/667 |
| 6,040,845 A | | 3/2000 | Melo et al. | |
| 6,046,738 A | * | 4/2000 | Eglit et al. | 345/213 |
| 6,067,071 A | * | 5/2000 | Kotha et al. | 345/698 |
| 6,067,083 A | * | 5/2000 | Glen et al. | 345/213 |
| 6,073,223 A | | 6/2000 | McAllister et al. | |
| 6,079,022 A | | 6/2000 | Young | |

(Continued)

FOREIGN PATENT DOCUMENTS

EP    155499 A2 *    9/1985

OTHER PUBLICATIONS

JEDEC Solid State Technology Associate; JEDEC Standard; DD42 SDRAM Specification; Jan. 2004; JEDEC Solid State Technology Association; Arlington, VA.

Primary Examiner—Thomas Lee  
Assistant Examiner—Paul B Yanchus, III  
(74) Attorney, Agent, or Firm—Vedder Price P.C.

(57) ABSTRACT

A variable clock control information generator receives vertical blank interval information corresponding to a vertical blank interval (VBI) during display rasterization. The vertical blank interval is a period of time in a video display signal that temporarily suspends transmission of video data as is known during display rasterization, to allow a display to return back up to (retrace) the first line of the display after scanning the end of the display. In response to the received vertical blank interval information, the variable clock control information generator produces memory clock control information to change the frequency of a memory clock divider signal during the detected vertical blank interval.

15 Claims, 7 Drawing Sheets

U.S. PATENT DOCUMENTS

| | | |
|---|---|---|
| 6,079,025 A | 6/2000 | Fung |
| 6,112,310 A | 8/2000 | Jun et al. |
| 6,130,660 A * | 10/2000 | Imsand ................ 345/698 |
| 6,151,681 A | 11/2000 | Roden et al. |
| 6,177,946 B1 | 1/2001 | Sinclair et al. |
| 6,209,075 B1 | 3/2001 | Lau |
| 6,232,955 B1 * | 5/2001 | Guttag et al. ........... 345/601 |
| 6,263,448 B1 | 7/2001 | Tsern et al. |
| 6,292,201 B1 | 9/2001 | Chen et al. |
| 6,307,281 B1 | 10/2001 | Houston |
| 6,460,125 B2 | 10/2002 | Lee et al. |
| 6,657,634 B1 | 12/2003 | Sinclair et al. |
| 6,820,209 B1 | 11/2004 | Culbert et al. |
| 6,836,848 B2 | 12/2004 | Yu et al. |
| 6,943,844 B2 * | 9/2005 | Cahill, III ................ 348/537 |
| 6,950,105 B2 | 9/2005 | Giemborek et al. |
| 7,000,065 B2 | 2/2006 | Wilcox et al. |
| 7,007,175 B2 | 2/2006 | Chang et al. |
| 7,028,200 B2 | 4/2006 | Ma |
| 7,036,032 B2 | 4/2006 | Mizuyabu et al. |
| 7,073,082 B2 | 7/2006 | Hsu |
| 7,093,153 B1 | 8/2006 | Witek et al. |
| 7,114,086 B2 | 9/2006 | Mizuyabu et al. |
| 7,315,957 B1 * | 1/2008 | Wagner et al. ............. 713/501 |
| 2001/0012230 A1 | 8/2001 | Takemae et al. |
| 2003/0128198 A1 | 7/2003 | Mizuyabu et al. |
| 2003/0210247 A1 | 11/2003 | Cui et al. |
| 2004/0039954 A1 | 2/2004 | White et al. |
| 2004/0073824 A1 | 4/2004 | Machida |
| 2004/0139359 A1 | 7/2004 | Samson et al. |
| 2004/0236896 A1 | 11/2004 | Kanapathippillai et al. |
| 2004/0243858 A1 | 12/2004 | Dennis et al. |
| 2005/0195181 A1 | 9/2005 | Khodorkovsky |
| 2005/0289369 A1 | 12/2005 | Chung et al. |
| 2005/0289377 A1 | 12/2005 | Luong et al. |
| 2006/0020835 A1 | 1/2006 | Samson et al. |
| 2006/0031690 A1 | 2/2006 | Chung et al. |
| 2006/0187226 A1 | 8/2006 | Bruno et al. |
| 2006/0259804 A1 | 11/2006 | Fry |

* cited by examiner

DYNAMIC CLOCK CONTROL CIRCUIT AND METHOD

FIELD OF THE INVENTION

The invention relates generally to processor systems and, more particularly, to clock control circuits for processor systems.

BACKGROUND OF THE INVENTION

Portable electronic devices, such as notebook computers, personal organizers, portable telecommunication equipment and other processor-based devices, consume much power during their display mode. These portable computers, and other processor-based devices, are known to include a central processing unit (CPU), video graphics circuitry, system memory and other peripheral circuits. In such computers, the central processing unit functions as a host processor, while the video graphics circuitry (e.g., a graphics coprocessor) functions as a loosely coupled coprocessor. By way of example, the video graphics circuitry may be an integrated circuit on a single semiconductor die, such as an application-specific integrated circuit (ASIC).

The power dissipation and performance characteristics of the CPU, video graphics circuitry, system memory and other integrated circuits are typically related to an operating frequency of a clock signal. Although the performance of the video graphics circuitry increases as the operating frequency of the clock signal increases, the video graphics circuitry also increases power consumption and generates more heat. Typically, the operating frequency of the clock signal is limited to a maximum clock frequency, commonly referred to as a nominal operating frequency.

Power consumption and thermal dissipation needs to be minimized for portable devices without unnecessarily sacrificing operational performance. Operational performance for a portable device may include display operations and video playback requiring real-time display processing, so that real-time display updating occurs on the LCD display, or any suitable display device. For example, video capture operations and gaming applications operate in real-time on a display. The need for minimizing power consumption without unnecessarily sacrificing operational performance also arises for nonportable devices, due to increased circuit density and increased clock speeds.

The video graphics circuit comprises a clock signal generator that includes a phase lock loop (PLL) circuit to generate a clock signal for the video graphics coprocessor (graphics engine), the graphics memory and a display device (or devices), such as a CRT, that a user may plug into the laptop computer or an LCD display that is mounted to the laptop computer. As is known in the art, the graphics engine may include programmable divider circuits or another PLL circuit for generating a corresponding graphics engine clock signal, other than the memory clock signal. Power and heat dissipation typically varies with clock frequency.

A laptop computer typically includes an operating system that functions under the control of a host central processing unit to provide suspend/standby information to a power management control system. The operating system generates the suspend/standby command information when, for example, the laptop computer is in a standby/suspend mode, as activated through a graphic user interface, software controlled timer, switch or other trigger event. For example, a memory controller receives the suspend/standby command data and in response places the memory in a self-refresh mode. The memory may be, for example, a dynamic RAM (DRAM), synchronous memory, such as synchronous dynamic RAM (SDRAM), or synchronous graphics RAM (SGRAM), or any other suitable graphics and/or video memory device. This memory may reside on the same semiconductor die (ASIC) as the video graphics coprocessor, or it may be separate and connected through board level or package level traces.

The operating system may disable the memory clock during suspend and standby modes to reduce the power consumption of the video graphics system, which includes the synchronous memories used for frame buffer operations. However, this power management function of the operating system typically only places the memory in a low power-suspend mode when the video graphics engine is completely idle, by turning off the memory clock and other clocks during the suspend mode. When the power management system on the operating system indicates that the display is in the active mode (e.g., the display is enabled), the memory is typically always enabled and the memory clock is always running at a nominal operating frequency. As a result, the memory either operates at the nominal operating frequency, or is completely idle, by turning off the memory clock and other clocks during the suspend mode. However, when the power management function on the operating system places the memory in the suspend or low power mode, the display becomes blank. Unfortunately, a blank display is unacceptable, especially for applications that require real-time display processing.

As previously stated, a user may change the memory clock frequency manually via a user interface such as an operating system that allows a user to change the power saving settings for the processor and memory clock frequencies. Such a technique requires that the user stop interacting with a particular application in order to access the user interface for changing the power saving settings. However, requiring a user to stop interacting with the application is unacceptable.

According to another method, the portable electronic device sets the memory clock frequency during reboot. The portable electronic device is typically programmed to establish a memory clock frequency during reboot that will provide long battery life. As a result, this method is limited to adjusting memory operation during reboot or manually after reboot.

According to another method, the portable electronic device changes power consumption settings in response to detecting a change of power source from an externally provided power source such as an external power supply or source of alternating current (A/C) to internal battery power. According to this method, the portable electronic device may change the clock frequency of the graphics processor and the memory in response to detecting the change of power source to control the power consumption of the portable electronic device. However, the display may flicker due to the change of the frequency for the memory clock signal. The flicker on the display may be caused by the change of frequency for the memory clock signal, which causes a corruption of the data in the memory. As a result, corruptions to data in the memory cause corruptions of the display, such as the moving of data, movement of an object in the display, or the display of missing or incorrect data. As previously stated, blanking or disabling the display for one or more display frames in order to prevent corrupted data from being displayed is unacceptable, especially for applications that require real-time display processing.

BRIEF DESCRIPTION OF THE DRAWINGS

The present invention is illustrated by way of example and not limitation in the accompanying figures, in which like reference numerals indicate similar elements and in which.

DETAILED DESCRIPTION OF THE PREFERRED EMBODIMENTS

A variable clock control information generator receives vertical blank interval information corresponding to a vertical blank interval (VBI) during display rasterization. The vertical blank interval is a period of time in a video display signal that temporarily suspends transmission of video data as is known during display rasterization, to allow a display to return back up to (retrace) the first line of the display after scanning the end of the display. In response to the received vertical blank interval information, the variable clock control information generator produces memory clock control information to change the frequency of a memory clock divider signal during the detected vertical blank interval.

Among other advantages, the variable clock information generator causes a change in the frequency of the memory clock divider signal, such that the change occurs during the vertical blank interval. During the vertical blank interval, the display temporarily suspends rasterization to allow the display to return to the first line of the display after scanning the end of the display. In effect, the display ignores rasterization data received from the memory during the vertical blank interval. As a result, any change or corruption of the rasterization information is not shown on the display. The change of frequency for the memory clock divider signal changes during the vertical blank interval, and the memory may resume sending rasterizer information to the display in order to generate the next frame. Since the change in frequency for the memory clock divider signal occurs after the vertical blank interval, the memory produces uncorrupted rasterizer information shown. As a result, the frequency of the memory changes without causing corruption of the display information. In addition, elimination or reduction of the corruption of data within the memory may be achieved by dynamically changing the memory clock divider signals from a first frequency to a second frequency without an intermediate frequency. By changing the memory clock divider signal from the first frequency to the second frequency without an intermediate frequency, the memory is less likely to encounter internal timing problems resulting in the corruption of data in the memory. According to another embodiment, the corruption of data in the memory may be avoided by placing the memory in a refresh mode. The refresh mode in the memory provides a clock signal to the memory internally, and therefore will ensure stability within the memory. Once the frequency of the memory clock divider signal is changed, then the memory may be placed out of the refresh mode, and may then receive the new memory clock signal at the new desired frequency such as the second frequency without an intermediate frequency.

Figure 1:
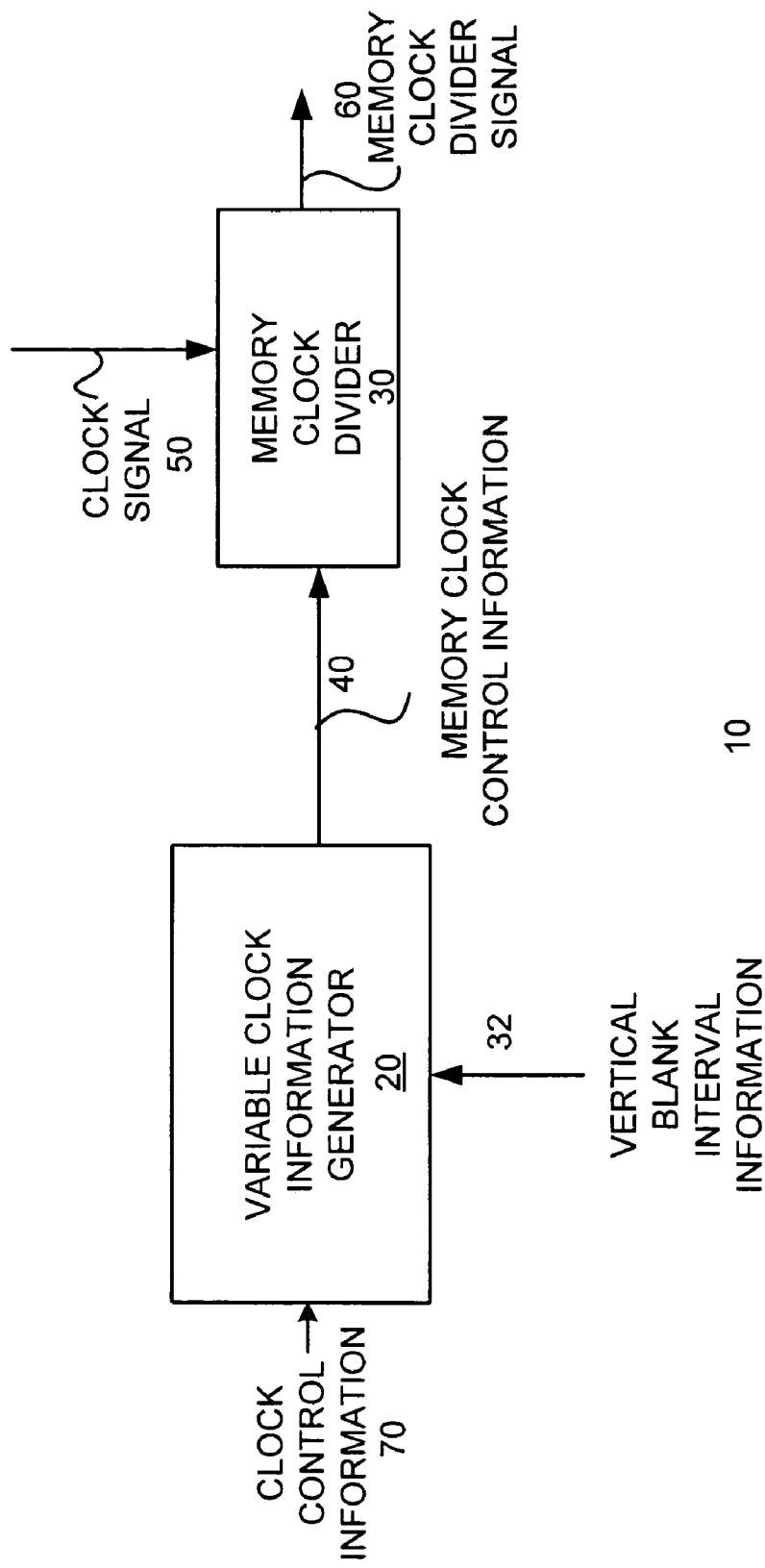
FIG. 1 is a block diagram illustrating one example of a clock control circuit in accordance with one exemplary embodiment of the invention.

FIG. 1 is a block diagram of a clock control circuit 10, including a variable clock information generator 20 and a memory clock divider 30. The variable clock information generator 20 receives vertical blank interval information 32 and in response produces memory clock control information 40.

The various elements of the clock control circuit 10 are linked by a plurality of links. The links may be any suitable mechanisms for conveying electrical signals or data as appropriate. According to one embodiment, the interface between the variable clock information generator 20 and the memory clock divider 30 may be a host processor to graphics co-processor interface, such as a PCI bus, an AGP bus, a PCI-express bus, an $I^2C$ (IC to IC) bus or any other suitable type of bus, either standardized or proprietary.

The vertical blank interval information 32 indicates the occurrence of the vertical blank interval during display rasterization. For example, the received vertical blank interval information 32 may indicate both the beginning of the vertical blank interval and/or the end of the vertical blank interval. According to yet another embodiment, the vertical blank interval information 32 provides an indication of the beginning of the vertical blank interval within a certain period of time. For example, the period of time before the occurrence of the vertical blank interval may provide an indication to the variable clock information generator 20 in order to accommodate any processing delays. Similarly, the vertical blank interval information 32 may provide an indication of the vertical blank interval ending before the actual end of the vertical blank interval in order to provide, for example, processing time and settling time for producing the memory clock control information 40.

According to one embodiment, the vertical blank interval typically represents a period of time between 200 micro-seconds and 500 micro-seconds, and as such, the vertical blank interval is relatively small compared to the display refresh period. For example, if the refresh rate of a display is fifty Hertz, then the period of time between display refresh is 20 milli-seconds. According to another example, if the refresh rate is sixty Hertz, then the period of time before display refresh is 16.6 milli-seconds. Accordingly, the vertical blank interval decreases as the display refresh frequency increases, and the vertical blank interval increases as the display refresh frequency decreases.

As known in the art, a computer typically includes a BIOS memory (Built In Operating System) which includes, among other things, display-type information, display refresh-type information, and the corresponding vertical blank interval information. During initialization of the computer system, the variable clock information generator 20 and the computer system may determine the type of display configured with the computer in order to determine the supported display refresh rate, the vertical blank interval and the corresponding variable clock information.

The variable clock information generator 20 may be one or more suitable programmed processors that has a microprocessor, a microcontroller or a digital signal processor whose associated memory contains executed instructions which, when executed, cause the variable clock information generator 20 to carry out the operations described herein. In addition, the variable clock information generator 20, as herein, includes discrete state machines or any other suitable combination of hardware, software or firmware.

The variable clock information generator 20 provides the memory clock control information 40 to the memory clock divider 30. The memory clock divider 30 receives the memory clock control information 40 and a clock signal 50 in order to produce a memory clock divider signal 60.

According to one embodiment, the memory clock divider 30 may be part of a phase lock loop circuit to control the frequency of the memory clock divider signal 60, as is know in the art. The phase lock loop circuit may provide the clock signal 50 to the memory clock divider 30, as well as other divider circuits. For example, a clock signal generator may provide a single common clock signal 50 to various clock divider circuits, such as the memory clock divider 30, in order to provide the required clock signals for the various components within the graphics processor.

Figure 2:
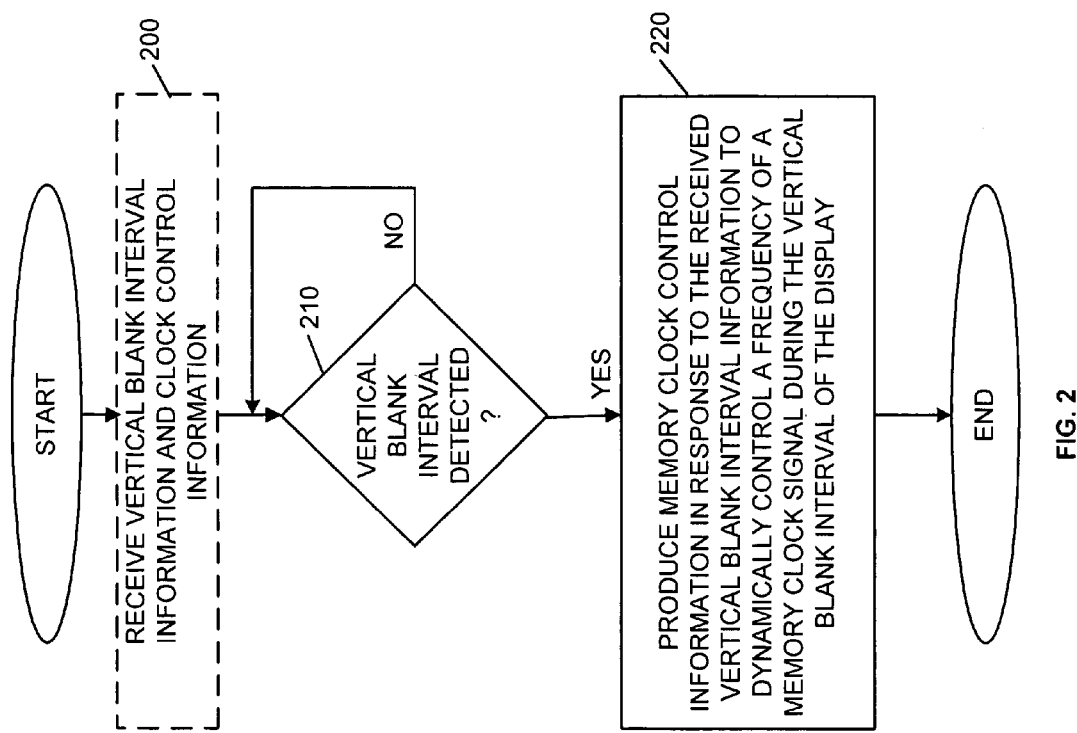
FIG. 2 is a flowchart illustrating one example of a method for controlling a clock signal in accordance with one exemplary embodiment of the invention.

FIG. 2 illustrates a clock control method for changing a frequency of the memory clock divider signal 60 such that any corrupted display information is not displayed on a graphics display. The method may be carried out by the clock control system 10 of FIG. 1. However, any other suitable structure may also be used. It will be recognized that the method beginning with step 210, or alternatively step 200, will be described as a series of operations, but the operations may be performed in any suitable order and may be repeated in any suitable combination.

As shown in optional step 200, the variable clock information generator 20 receives the clock control information 70. According to one embodiment, the variable clock information generator 20 produces the memory clock control information 40 in response to receiving clock control information 70. The clock control information 70 may relate to a request to change the frequency of the memory clock divider signal 60. For example, the clock control information 70 may request increasing or decreasing the frequency of the memory clock divider signal 60. The clock control information 70 may be provided by a power management control system, as previously described.

As shown in step 210, the variable clock information generator 20 receives the vertical blank interval information 32 associated a vertical blank interval during display rasterization. As previously described, the vertical blank interval information 32 may include a period of time either before or after the start of the vertical blank interval or a period of time before or after the end of the vertical blank interval.

As shown in step 220, the variable clock information generator 20 produces the memory clock control information 40 in response to the received vertical blank interval information 32 to dynamically change a frequency of the memory clock divider signal 60 during the detected vertical blank interval.

Figure 3:
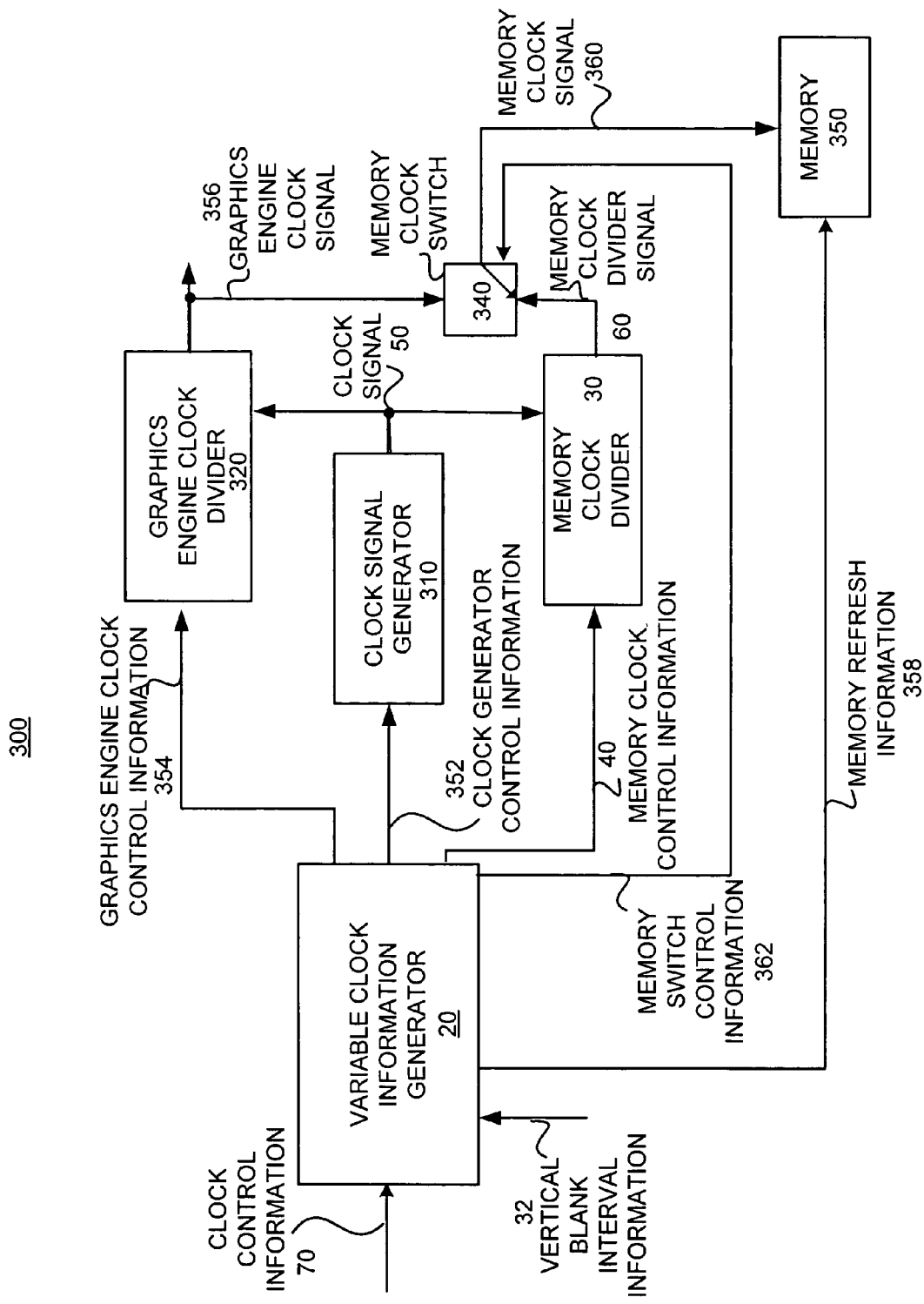
FIG. 3 is a block diagram illustrating another example of the clock control circuit in accordance with another exemplary embodiment of the invention.

FIG. 3 illustrates one embodiment of a clock control system 300 in accordance with another exemplary embodiment of the invention. The clock control system 300 includes a clock signal generator 310, a graphic engine clock divider 320, a memory clock divider 30, a memory clock switch 340 and memory 350. The clock signal generator 310 receives clock generator control information 352 from the variable clock information generator 20, and in response produces the clock signal 50. As previously described, the clock signal generator 310 may be a phase lock loop circuit for producing the clock signal 50. The graphics engine clock divider 320 receives graphics engine clock control information 354 and the clock signal 50, and in response produces the graphics engine clock signal 356. As previously described with respect to the memory clock divider 30, the graphics engine clock divider 320 divides the clock signal 50 in accordance with the graphics engine clock control information 354 in order to change the frequency of the clock signal 50, and in turn to produce the graphics engine clock signal 356.

The various elements of the clock control system 300 are linked by a plurality of links suitable for conveying electrical signals or data, as previously discussed. The interface between the variable clock information generator 20 and the memory 350 may be a PCI bus, an AGP bus, a PCI-express bus, an I²C (IC to IC) bus or any other suitable type of bus.

According to one embodiment, the variable clock information generator 20 produces memory switch control information 362 in response to the received vertical blank interval information 32 to switch a memory clock signal 360 from the memory clock divider signal 60 to the graphics engine clock signal 356. The memory clock switch 340 may be one or more transistors suitable for switching the memory clock signal 360 between the memory clock divider signal 60 and the graphics engine clock signal 356 in response to receiving the memory switch control information 362. The variable clock information generator 20 produces the memory clock control information 40 to dynamically change the frequency of the memory clock divider signal 60 while the memory clock signal 360 is switched to the graphics engine clock signal 356. Since the memory clock signal 360 is switched to the graphics engine clock signal 356 by the memory clock switch 340, any change in frequency of the memory clock divider signal will not affect the memory clock divider 360, thereby avoiding corruption of data within memory 350.

According to one embodiment, the variable clock information generator 20 provides memory switch control information 362 to the memory clock switch 340 via the memory switch control register 538 in order to switch the memory clock signal 360 from the graphics engine clock signal 356 to the memory clock divider signal 60 after the frequency of the memory clock divider signal 60 has substantially changed. The frequency of the memory clock divider signal 60 substantially changes, such that when the memory clock signal 360 is switched to the memory clock divider signal 60, the memory 350 will not experience corruption of data. Since the change of frequency of the memory clock divider signal 60 may cause a transition of the frequency of the memory clock divider signal 60, the target frequency may require a settling period such that the frequency of the memory clock divider signal 60 has substantially changed, and as such provides an adequate stable memory clock signal 360 so that the internal timing of memory 350 will not cause, or will minimize the occurrence of corruption of any data within memory 350.

Figure 4:
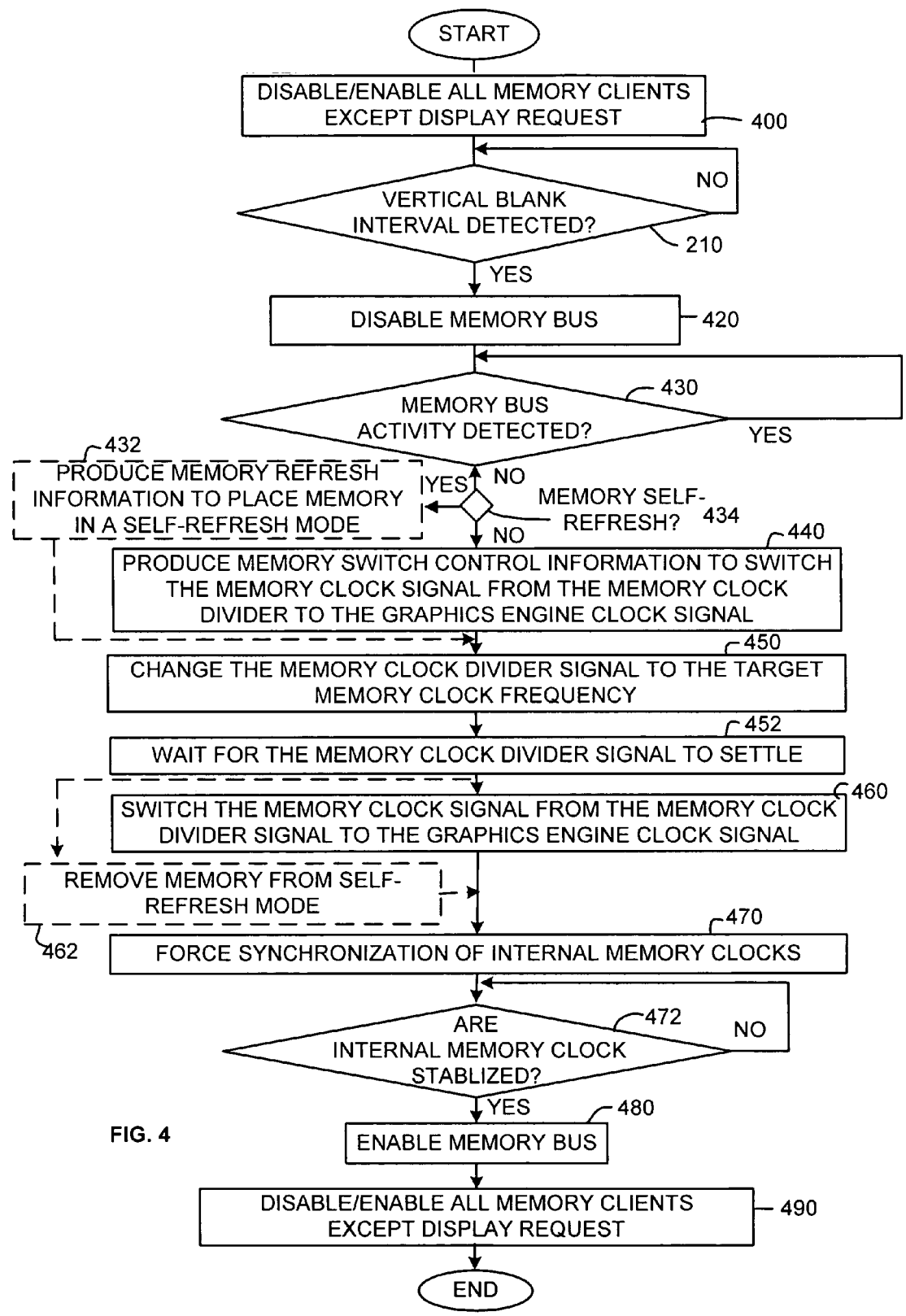
FIG. 4 is a flowchart illustrating another example of a method for controlling a clock signal according to another exemplary embodiment of the invention.

FIG. 4 illustrates a clock control method for dynamically changing a frequency of the memory clock divider signal 60 during the detected vertical blank interval, in accordance with another exemplary embodiment of the invention. The method may be carried out by the clock control circuit 10 or the clock control system 300, however, any other suitable structure may also be used. The method, beginning with step 400, will be described as a series of operations, but the operations may be performed in any suitable order and may be repeated in any suitable combination.

As shown in step 400, the variable clock information generator 20 disables at least one memory client except the display request client. A memory client is any device that accesses or makes a request to read from or write to memory 350. The memory client may be, for example, a 2D-3D GUI memory engine, a display engine, a host CPU, a video request engine, onboard SDRAM, SGRAM or other RAM, serving as a frame buffer memory within the memory 350, and other devices not shown, such as a video capture engine and a video playback engine. The display request client is allowed to remain enabled in order to allow updating of the display. According to one embodiment, the variable clock information generator 20 disables all memory clients except the display request client.

As shown in step 210, the variable clock information generator 20 detects a vertical blank interval based on the received vertical blank interval information 32, as previously discussed.

As shown in step 420, the variable clock information generator 20 disables a memory bus 556 (shown in FIG. 5) coupled to the memory 350. For example, as is known in the art, a memory controller 554 controls access to the memory 350 via the memory bus 556. Therefore, the variable clock information generator 20 may disable the memory bus 556 by setting a bit in a memory controller register (not shown) to control access to the memory 350 via the memory bus 556. For example, the variable clock information generator 20 provided memory bus control information 552 to the memory controller 546 in order to cause the memory controller 546 to place the memory bus 556 into either an active state or a high impedance state. As such, the variable clock information generator 20 may disable at least one of the memory clients. Accordingly, then the number of requests, such as read or write requests to the memory 350, will be eliminated or substantially reduced so that the variable clock information generator 20 may disable the memory bus 556.

As shown in step 430, the variable clock information generator 20 determines if there is any memory bus activity. For example, the variable clock information generator 20 may poll or alternatively wait a predetermined amount of time after sending the memory bus control information to the memory controller to place the memory bus 556 into a high impedance state. Since the variable clock information generator 20 requests placing the memory bus 556 into a high impedance state, any remaining memory bus activity may be allowed to complete a request of an access to memory 350 before the memory bus is placed into the high impedance state. According to another embodiment, the memory controller 546 may monitor activity on the memory bus 556 and report to the variable clock information generator 20, via for example, an interrupt when the memory bus activity is no longer detected.

As shown in step 434, the variable clock information generator 20 determines if the memory 350 should be placed in a self refresh mode while the frequency of the memory clock divider signal 60 is changed. For example, the variable clock information generator 20 may determine if either the memory 350 should be placed in a self refresh mode or if the memory clock signal 360 should be switched to the graphics engine clocks signal 356 based on, for example, the amount of frequency change for the memory clock divider signal 60 and the amount of time available for performing such a change.

As shown in step 440, according to one embodiment, the variable clock information generator 20 produces the memory switch control information 362 in response to the received vertical blank interval information 32, to switch the memory clock signal 360 from the memory clock divider signal 60 to the graphics engine clocks signal 356. Accordingly, the graphics engine clock signal 356 may be controlled such that the frequency of the graphics engine clock signal 356 matches the frequency of the memory clock divider signal 60 prior to the memory clock switch 340 switching the memory clock signal 360 to the graphics engine clock signal 356. In this way, the memory 350 will not experience a change in clock frequency of the memory clock divider signal 60 while the memory clock divider 30 changes the frequency of the memory clock divider signal 60.

As shown in alternative step 432, the variable clock information generator 20 produces memory refresh information 358 to refresh the memory 350 while dynamically changing the frequency of the memory clock divider signal 60, in response to at least the received vertical blank interval information 32. For example, the variable clock information generator 20 may cause the memory 350 to be placed into a self refresh mode in order to allow the memory clock divider 30 to change the frequency of the memory clock divider signal 60.

As shown in step 450, the variable clock information generator 20 produces the memory clock control information 40 to dynamically change the frequency of the memory clock divider signal 60 while the memory clock signal 360 is switched to the graphics engine clock signal 356, or the memory 350 is in the self refresh mode.

As shown in step 452, the variable clock information generator 20 may wait a sufficient amount of time for the memory clock divider signal 60 to settle, as a result of the memory clock divider 30 changing the frequency of the memory divider signal 60. For example, according to one embodiment, the variable clock information generator may include a timer that may be programmed with an amount of time to wait based on a trigging event. According to one embodiment, the variable clock information generator 20 waits approximately 250 microseconds for the memory clock divider signal 60 to settle; however, this settle time may vary, depending on the type of memory 350 used the display refresh rate and the amount of frequency change for the memory clock divider signal 60. As is recognized by one skilled in the art, as improvements in technology and in hardware and software continue, the settling time for the memory clock divider 30 to change the memory clock divider signal 60 from a first frequency to a second frequency will similarly decrease and, as such, the wait time for the memory clock divider signal 60 to settle will correspondingly decrease as well.

As shown in step 460, if the memory clock switch 340 has switched the memory clock signal 360 to the graphics engine clock signal 356, then the variable clock information generator 20 will provide the memory switch control information 362 to the memory clock switch 340 in order to switch the memory clock signal 360 from the graphics engine clock signal 356 to the memory clock divider signal 60 after the frequency of the memory clock divider signal 60 has substantially changed. As previously discussed, the variable clock information generator 20 may provide the memory switch control information 362 at an appropriate point in time to accommodate the settling of the change of frequency for the memory clock divider signal 60, as well as an allowance for any other settling time.

As shown in step 462 if, however, the memory 350 was placed in a self refresh mode, then the variable clock information generator 20 provides memory refresh information 358 to the memory 350 in order to remove the memory 350 from the self refresh mode. Similarly, as discussed above, the variable clock information generator 20 may coordinate the delivery of the memory switch control information 362 to the memory clock switch 340 such that, by the time the memory clock signal 360 is switched from the graphics engine clock signal 356 to the memory clock divider signal 60, the memory clock divider signal 60 has settled to the desired change in frequency.

As shown in step 470, the variable clock information generator 20 forces synchronization of the internal memory clock 350. For example, the variable clock information generator 20 may send a command to the memory 350 in order to perform the synchronization of the internal clocks within the memory 350.

As shown in step 472, the variable clock information generator 20 determines by polling for examples or waits until the internal memory may receive an indication such as an interrupt message clocks within the memory 350 are stabilized. According to one embodiment, the variable clock information generator 20 may receive an indication such as an interrupt message from the memory 350, indicating that the internal clocks are stabilized or, alternatively, the variable clock information generator 20 may wait a preset amount of time once the memory refresh information 358 is provided to the memory 350 in order to allow sufficient time for the clocks to stabilize.

As shown in step 480, the variable clock information generator 20 enables the memory bus. As similarly described above with respect to step 420, the variable clock information generator 20 may provide memory bus control information 552 to the memory controller 546 in order to enable the memory bus 556, as is known in the art.

As shown in step 490, the variable clock information generator 20 enables the at least one memory client. Since the display request client was not disable, the display request client is already enabled and therefore there is no need to enable the display request client again. As such, the variable clock information generator 20 allows the memory clients, as discussed above with respect to step 400, to continue utilization of the memory bus 556. According to one embodiment, the variable clock information generator 20 enables all memory clients except the display request client.

Figure 5:
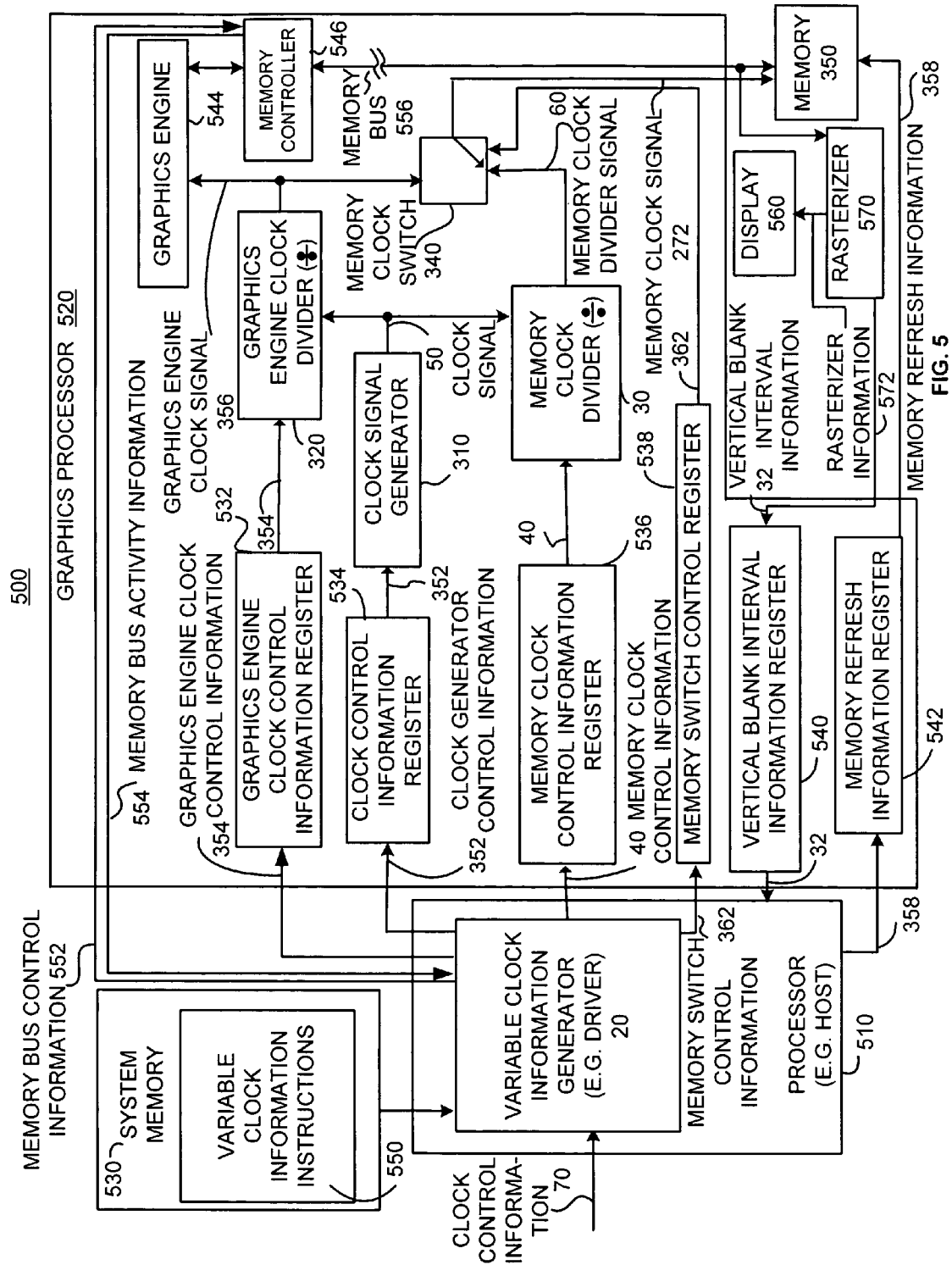
FIG. 5 is a block diagram illustrating an example of a clock control system in accordance with another exemplary embodiment of the invention.

FIG. 5 illustrates a clock control system in accordance with exemplary embodiment of the invention. The clock control system 500 includes a processor 510, a graphics processor 520, memory 350 system memory 530. The graphics processor 520 includes a graphics engine clock control information register 532, a clock control information register 534, a memory clock control information register 536, a memory switch control register 538, a vertical blank interval information register 540, a memory refresh information register 542, a graphics engine 544 and a memory controller 546. The clock control system 500 further includes a display 560 and a rasterizer 520.

The various elements of the clock control system 500 are linked by a plurality of links suitable for conveying electrical signals or data as previously described. According to one embodiment, the interlace between the processor 510 and the memory clock divider 30 may be a host processor to graphics co-processor interface, such as a PCI bus, an AGP bus, a PCI-express buss, and I²C (IC to IC) bus or any other suitable type of bus, either standardized or proprietary. Alternatively, the interface between the processor 510, the graphics processor 520, system memory 530 and the memory 350 may be an integrated circuit interconnection within an application specific integrated circuit (ASIC). Graphics engine 544 may be coupled to memory 350 via bus 556 such as an AGP bus, a PCI-express bus, an I²C (IC to IC) bus, an integrated circuit interconnection within an application specific integrated circuit (ASIC) or any other suitable type of bus, either standardized or proprietary.

According to one embodiment, the variable clock information generator 20 represents a driver or any suitable executable software program operating in the processor 510, such as a host processor. For example, the processor 510 executes variable clock information instructions 550 contained in the system memory 530 that causes the processor to dynamically change the frequency of the memory clock divider signal 60 during the detected vertical blank interval, as previously described.

The variable clock information generator 20 such as, for example, a driver, may provide graphics engine clock control information 354 to the graphics engine clock control information register 532. Generally speaking, the variable clock information generator 20 may control various portions of the graphics processor 520 by writing to a register such that the register provides the information to the appropriate subsection of the graphics processor 520. For example, the clock signal generator 310 receives the graphics engine clock control information 352 and in response produces the clock signal 50. According to one embodiment, the system memory 530 contains variable clock information instructions 550 that cause the variable clock information generator, 20, such as a driver operating the processor 510, such as a host, to provide the graphics engine clock control information 354 to the graphics engine clock control information register 532 in response to at least the received vertical blank interval information 32 to dynamically change the frequency of the graphics engine clock signal 356. Similarly, the memory switch control register 538 receives the memory switch control information 362 and in response provides the memory switch control information 362 to the memory clock switch 340 in order to switch the memory clock signal 272 from either the memory clock divider signal 60 or the graphics engine clock signal 356.

According to one embodiment, the graphics engine clock divider 320 and the memory clock divider 30 are fractional dividers to provide the ability to change the graphics engine clock signal 356 and the memory clock divider signal 60 to any suitable desired frequency. Accordingly, the frequency of the graphics engine clock signal 356 and the memory clock divider signal 60 may be changed with any suitably sized steps to produce intermediate frequencies or to transition directly to a desired frequency to ensure that the graphics engine 544 and the memory 350 do not experience a discontinuity in processing or do not, for example, experience of any corruption of data.

As is known in the art, rasterizer 570 receives data from a frame buffer such as memory 350, and produces rasterizer information 572. Depending on the type of display 560, rasterizer 570 provides rasterizer information written to the display 560 in a raster order. As known in the art, raster order refers to scanning from left to right and top to bottom, line-by-line. According to one embodiment, display 560 is a liquid crystal display (LCD). According to another embodiment display 560 may be any suitable display such as a plasma display or a cathode ray tube (CRT) display in which an electron gun scans from the top-left toward the bottom-right of the display 560. Once the gun reaches the lower left of the display screen, a vertical blank interval occurs, and the rasterizer 570 produces the vertical blank interval information 32 as the gun or scan device moves back to the top left.

Figure 6:
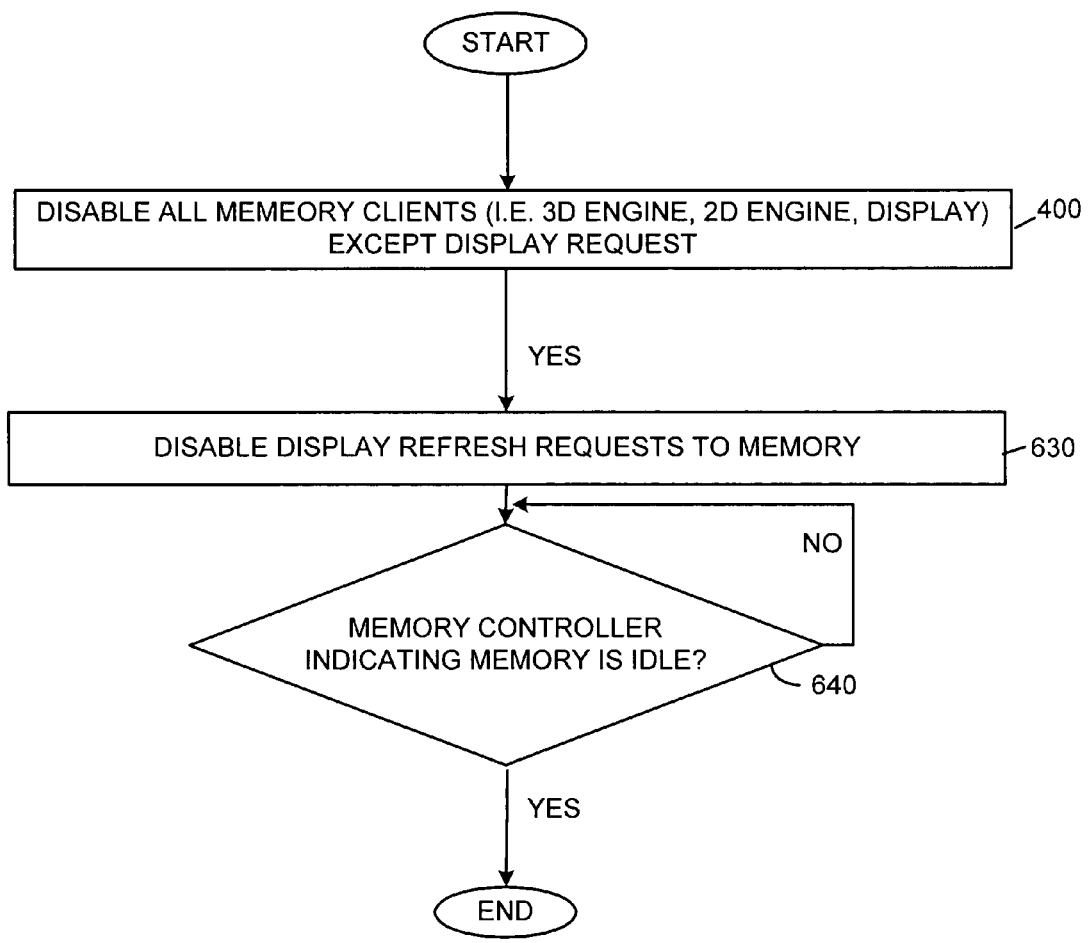
FIG. 6 is a flowchart illustrating one example of a method for disabling at least one memory client in accordance with one exemplary embodiment of the invention.

FIG. 6 illustrates a method for disabling at least one memory client of the memory 350 in accordance with another exemplary embodiment of the invention. The method may be carried out by the variable clock control information generator 20; however, any other suitable structure may be used. The method, beginning with step 400 will be described as a series of operations, but the operations may be performed in any suitable order and may be repeated in any suitable combination. The method beginning with step 600 is a more detailed method of disabling at least one memory client, as previously discussed with respect to FIG. 4.

As shown in step 400, the variable clock information generator 20 provides the memory bus control information 552 to the memory controller 546 to disable the dedicated clients such as the cursor and icon, but not the display request client as previously described. As a result of step 400, the memory controller 546 disables all memory clients so that no requests for information or no requests for writing information to memory 350 will be allowed. Memory clients, as previously discussed, may include software clients, such as a 3D engine, a 2D engine, and a display and dedicated clients such as the cursor and the icon. As such, the variable clock information generator 20 provides the memory bus control information 552 to the memory controller 546 to disable both software clients and the dedicated clients such as the cursor and icon. As previously described with respect to steps 420 and 480 of FIG. 4, the memory controller 546 receives memory bus control information 552 to disable the memory bus 554 coupled to the memory controller 546 and the memory 350 during the dynamic change of the frequency of the memory clock divider signal 60.

As shown on step 630, the variable clock information generator 20 disables display refresh requests to memory. For example, the variable clock information generator 20 disables refresh requests to memory 350 so that no display refresh request occurs while the variable clock information generator 20 changes the frequency of the memory clock divider signal 60.

As shown on step 640, the memory controller 546 indicates that the memory controller 546 is idle such that no refresh requests are made to the memory and no commands are currently pending in the command buffer queue in response to memory controller 546 providing memory buffer activity information 554 to the variable clock information generator 20. At this point, although FIG. 6 indicates that the method ends, processing may continue at step 310 as shown in step FIG. 4. As such, according to the embodiment discussed above, no requests for memory and no requests to write to memory 350 are currently pending, and therefore the method continues at step 210 as shown in FIGS. 2 and 4, so that the variable clock information generator 20 awaits for a vertical blank interval to be detected.

Figure 7:
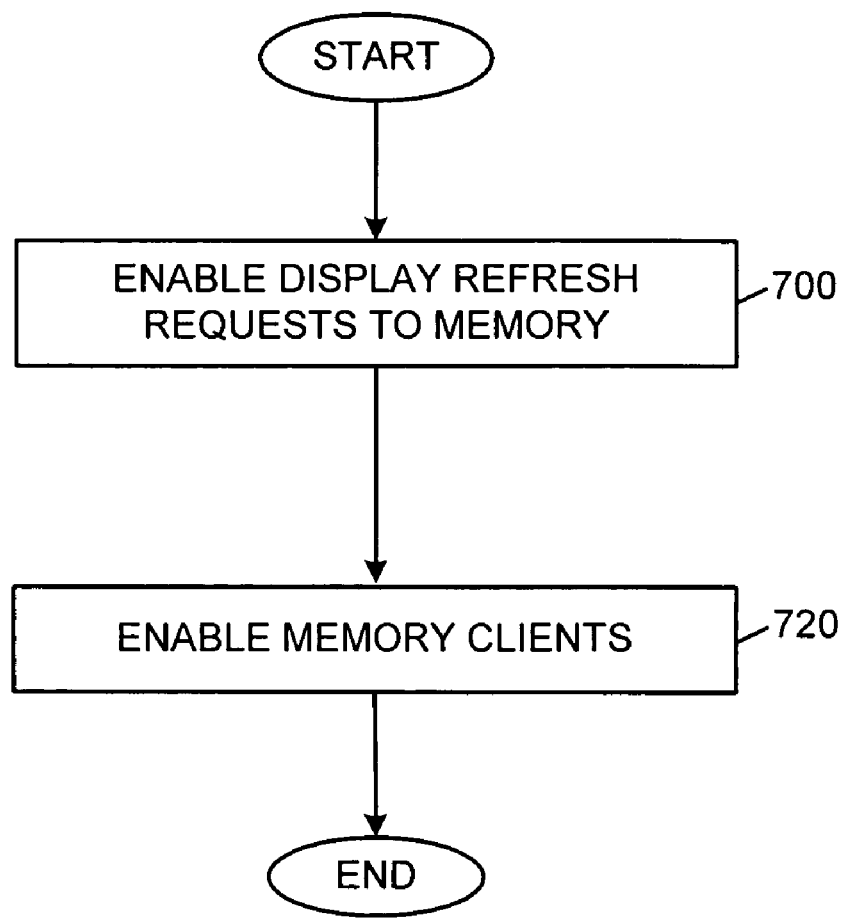
FIG. 7 is a flowchart illustrating one example of a method for enabling at least one memory client according to one exemplary embodiment of the invention.

FIG. 7 illustrates a more detailed method for enabling the memory bus 556. The method may be carried out by the variable clock information generator 20; however, any other suitable structure may also be used. The method, beginning with step 700, will be described as a series of operations, but the operations may be performed in any suitable order and may be repeated in any suitable combination of operations.

As shown in step 700, the variable clock information generator 20 enables display refresh requests to memory 350. This step re-enables display refresh requests that were disabled in step 630.

As shown in step 720, the variable clock information generator 20 enables memory clients, such as software clients previously described the graphics engine 544; i.e., 3D engine, 2D engine, the display 560 and the rasterizer 570. Step 720 enables the memory clients that were disabled in step 400.

A variable clock control information generator receives vertical blank interval information corresponding to a vertical blank interval (VBI) during display rasterization. The vertical blank interval is a period of time in a video display signal that temporarily suspends transmission of video data as is known during display rasterization, to allow a display to return back up to (retrace) the first line of the display after scanning the end of the display. In response to the received vertical blank interval information, the variable clock control information generator produces memory clock control information to change the frequency of a memory clock divider signal during the detected vertical blank interval.

It is understood that the implementation of other variations and modifications of the present invention and its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

The invention claimed is:

1. A clock control system comprising:
memory containing instructions executable by a processor that causes the processor to:
receive at least vertical blank interval information associated with a vertical blank interval during display rasterization and, in response, to produce clock generator control information;
produce memory clock control information in response to at least the received vertical blank interval information to dynamically change a frequency of a memory clock signal during the vertical blank interval;
a graphics processor, operatively coupled to the processor, including:
a clock signal generator operative to receive the clock generator control information and in response to produce a clock signal;
a memory clock divider, operatively coupled to the clock signal generator and operative to receive the memory clock control information and the clock signal, and in response to produce the memory clock signal;
a graphics engine clock divider, operatively coupled to the clock signal generator, and operative to receive graphics engine clock control information and in response to produce a graphics engine clock signal;
a memory clock switch, operatively coupled to the graphics engine clock, the memory clock and to an additional memory, and operative to receive the memory clock signal, the graphics engine clock signal and memory switch control information and in response to switch the memory clock signal from the memory clock divider signal to the graphics engine' clock signal; and
switch the memory clock signal to the received memory clock divider signal in response to a change of the frequency of the memory clock divider signal.

2. The clock control system of claim 1 wherein the memory contains instructions that cause the processor to:
provide memory refresh information to an additional memory while dynamically changing the frequency of the memory clock divider signal in response to at least the received vertical blank interval information.

3. The clock control system of claim 1, wherein the graphics processor further includes:
a clock control information register, operatively coupled to the processor and the clock signal generator, and operative to receive the clock generator control in formation;

a memory clock control information register, operatively coupled to the processor and the memory clock, and operative to receive the memory clock control information;

a vertical blank interval information register, operatively coupled to the processor, and operative to provide the vertical blank interval information;

a graphics engine clock control information register, operatively coupled to the processor and the graphics engine clock, and operative to receive graphics engine clock control information;

a memory switch control register operatively coupled to the processor, and operative to receive memory switch control information; and a memory refresh information register, operatively coupled to the processor, and operative to receive memory refresh information.

4. The clock control system of claim 1, further including:

an additional memory, operatively coupled to at least one of: the memory clock and the graphics engine clock, and operative to receive at least one of: the memory clock signal and the graphics engine clock signal;

wherein the graphics processor further includes:

a graphics engine, operatively coupled to the graphics engine clock divider, and operative to receive the graphics engine clock signal.

5. The clock control system of clan n 1, wherein the memory contains instructions that cause the processor to prevent at least one of: writing and reading to an additional memory while dynamically changing the frequency of the memory clock signal.

6. The clock control system of claim 1 wherein the graphics processor further includes a memory controller, wherein the memory contains further instructions that cause the processor to send memory bus control information to the memory controller to disable a memory bus coupled to the memory controller during the dynamic frequency change of the memory clock signal.

7. A clock control method comprising:

receiving, by a clock control system, vertical blank interval information associated with a vertical blank interval during display rasterization; and determining, by a clock control system in response to the receiving, if a memory should be placed in a self refresh mode or if a memory clock should be switched to a graphics engine clock, based on an amount of time available for making a change in frequency for a memory clock signal for the memory.

8. A clock control method comprising:

receiving vertical blank interval information associated with a vertical blank interval during display rasterization;

producing memory clock control information in response to at least the received vertical blank interval information to dynamically change a memory clock signal from a first frequency to a second frequency without an intermediate frequency during the vertical blank interval;

producing memory switch control information, in response to at least the received vertical blank interval information, to switch the memory clock signal from a memory clock signal to a graphics engine clock signal;

dynamically changing the memory clock signal from the first frequency to the second frequency while the memory clock signal is switched to the graphics engine clock signal; and switching the memory clock signal to the memory clock signal after changing the memory clock divider signal from the first frequency to the second frequency.

9. Memory containing instructions executable by one or more processing devices that cause the one or more processing devices to:

receive vertical blank interval information associated with a vertical blank interval during display rasterization;

produce memory clock control information in response to at least the received vertical blank interval information to dynamically change a frequency of a memory clock divider signal during the vertical blank interval;

produce memory switch control information, in response to at least the received vertic blank interval information, to switch a memory clock signal from the memory clock signal to a graphics engine clock signal;

dynamically change the frequency of the memory clock signal while the memory clock signal is switched to the graphics engine clock signal; and switch the memory clock signal from the graphics engine clock signal to the memory clock divider signal in response to changing the frequency of the memory clock signal.

10. A clock control circuit comprising:

an input to receive vertical blank interval information and circuitry, in response thereto and during a vertical blank interval, operative to dynamically change a frequency of a memory clock divider signal while a memory clock signal is switched to a different clock signal source; and wherein the circuitry is operative to determine if a memory should be placed in a self refresh mode or if the memory clock signal should be switched to a graphics engine clock signal based on an amount of time available for performing such a change.

11. The clock control circuit of claim 10 wherein switching to a different clock signal includes switching to a graphics engine clock signal to provide the memory clock signal to memory while dynamically changing the frequency of the memory clock divider signal for memory during the vertical blanking interval.

12. The clock control circuit of claim 10 including a variable clock control information generator operative to:

produce memory switch control information, in response to at least the received vertical blank interval information, to switch the memory clock signal for the memory from the memory clock divider signal to a graphics engine clock signal;

produce the memory clock control information to dynamically change the frequency of the memory clock divider signal while the memory clock signal for the memory is switched to the graphics engine clock signal; and switch the memory clock signal from the graphics engine clock signal to the memory clock divider signal in response to the change of the frequency of the memory clock divider signal.

13. The clock control circuit of claim 12, wherein the variable clock control information generator is operative to:

produce memory refresh information to refresh a memory while dynamically changing the frequency of the memory clock divider signal, in response to at least the received vertical blank interval information.

14. The clock control circuit of claim 10, wherein the variable clock control information generator is operative to prevent at least one of writing and reading to a memory while dynamically changing the frequency of the memory clock divider signal.

15. The clock control circuit of claim 14 further including a memory controller operatively coupled to the variable clock control information generator and the memory, wherein the variable clock control information generator is operative to: send memory bus control information to the memory controller to disable a memory bus coupled to the memory controller and the memory during the dynamic frequency change of the memory clock divider signal.

* * * * *